United States Patent [19]

Fava et al.

[11] Patent Number: 4,648,035
[45] Date of Patent: Mar. 3, 1987

[54] ADDRESS CONVERSION UNIT FOR MULTIPROCESSOR SYSTEM

[75] Inventors: Thomas F. Fava; Robert Bean; Richard F. Lary; Robert Blackledge, all of Colorado Springs, Colo.

[73] Assignee: Digital Equipment Corporation, Maynard, Mass.

[21] Appl. No.: 447,229

[22] Filed: Dec. 6, 1982

[51] Int. Cl.[4] .............................................. G06F 15/16
[52] U.S. Cl. .................................................... 364/200
[58] Field of Search ... 364/200 MS File, 900 MS File

[56] References Cited

U.S. PATENT DOCUMENTS

| 3,426,332 | 2/1969 | Cenfetelli | 364/200 |
| 4,056,819 | 11/1977 | Lukas | 364/200 X |
| 4,315,310 | 2/1982 | Bayliss et al. | 364/200 |
| 4,407,016 | 9/1983 | Bayliss et al. | 364/200 |
| 4,433,376 | 2/1984 | Lombardo et al. | 364/200 |

OTHER PUBLICATIONS

Katsuki et al, "Pluribus, an Operational Fault—Tolerant Microprocessor", Proceedings of the IEEE, vol. 66, No. 10, pp. 1146-1159, (Oct. 1978).

Primary Examiner—Gareth D. Shaw
Assistant Examiner—Christina M. Eakman
Attorney, Agent, or Firm—Cesari and McKenna

[57] ABSTRACT

An address conversion unit for a multiprocessor system including a common memory, and in which at least one processor includes a private memory, with the private memory and common memory having separate and distinct memory spaces. The conversion unit converts addresses between private addresses that are used within the processor itself and addresses that are used to retrieve contents of locations in common memory.

20 Claims, 3 Drawing Figures

ns and one

ADDRESS CONVERSION UNIT FOR MULTIPROCESSOR SYSTEM

BACKGROUND OF THE INVENTION

1. Field of the Invention

This invention generally relates to the field of data processing systems employing multiple memories and more specifically to multiprocessing systems employing a common memory for all of the processors and a private memory for one of the processors. The common memory and private memory have distinct memory spaces, and the invention allows the processor having access to the private memory to also be able to access memory locations in both the memory space for the common memory and the memory space for the private memory.

2. Description of the Prior Art

The reduction in the cost and size of processors used in electronic data processing systems over the last few years has given rise to a dramatic increase in the number of processors that are used in data processing systems. A number of data processing systems have been developed in which several processors are used to process user programs. In some of these systems, the different processors may be specially designed to execute certain classes of instructions, such as fixed or floating point instructions, matrix instructions, or instructions that operate on character string. In other systems, different processors may process the same classes of instructions; in such a system, the operation is enhanced by the plural processors processing a number of user programs more quickly. Furthermore, several other elements of data processing systems, such as control units that control many of the peripheral elements such as disk and tape storage systems and input/output control units, employ one or more processors.

Multiprocessor systems can be constructed with one common memory that is accessable by all of the processors. However, if the system requires a high rate of memory accesses, it can be slowed down by contentions for the memory. If there is substantial duplication among the processors of programs and data, which may be the case, for example, in some multiprocessor systems in which several processors process user programs, a single common memory may be desirable. Such a system may also include several interleaved memories to reduce delays due to contentions for memory.

Alternatively, it often is desirable to provide a private memory that is accessible by only one of the processors. This may be done if the processor has specialized functions other than, or in addition to, the functions of the other processors. For example, if the multiprocessor system employs a master processor to schedule and coordinate processing by a number of slave processors, only the master processor need have access to the programs and data that allow it to perform this function. Similarly, for processors that control disk or tape drives in a peripheral controller, a private memory may store data and programs that allow them to perform these operations. A common memory may also be provided to store data and programs that are used by a number of processors. This arrangement would reduce the number of accesses of the common memory, and can enhance system performance.

Problems arise, however, in multiprocessor systems having one memory common to the processors and one or more private memories for the various processors. In such a systems, each of the memories may have a distinct address "space", or set of addressable locations, and the system must be configured to be able to distinguish between addresses that are intended for the common memory and addresses that are intended for the private memories to ensure that the correct locations are accessed.

Furthermore, the processors that have access to a common memory as well as to a private memory must be provided with addresses which are usable by them in processing their programs. These addresses normally must be addresses in their private memory spaces, even when processing programs that require references to programs or data that are stored in the common memory. Such processors typically use the addresses of the private memory space when processing their programs, and, to be able to refer to information stored in the common memory, must be provided with addresses in the private memory space that they may use to refer to the actual locations in the common memory in order to process such programs.

SUMMARY

It is therefore an object of the invention to provide a new addressing arrangement for a multiprocessing system.

It is a further object of the invention to provide a new and improved multiprocessing system which includes both a common memory for all of the processors and a private memory for one processor, and in which the processor having the private memory may access memory locations in both memory spaces.

In brief, the invention provides a multiprocessing system having a common memory for all of the processors, and in which one or more of the processors have a private memory. The common memory and a private memory have separate and distinct memory spaces. A processor having a private memory has an address conversion unit that, in response to addresses from the processor in a portion of its memory space that is within the private memory space of the processor, but distinct from the range of addresses for the private memory, generates addresses that are in the address space for the common memory.

The address conversion unit includes a set of registers which are loaded with pointers to blocks of addresses in the common memory address space. When the processor transmits an address within the range for the address conversion unit, the address conversion unit retrieves the most significant bits of the contents of a register selected by the address from the processor as the most significant portion of the addressed location in common memory. The least significant bits of the address transmitted by the processor are concatenated onto the end of the bits retrieved from the register as the least significant portion of the addressed location in common memory.

In addition, the address conversion unit, in response to an address in the address space of the common memory, generates addresses that are in the private memory space that its processor may use when referring to the common memory address while processing its programs. The address in the common memory may be provided by any of the processors in the system. The address conversion unit, on receipt of the common memory address, stores the address in a register. Its processor may read the register to determine the common memory address. When the processor reads the register, the address conversion unit converts the common memory address that is stored in the register to an address in the processor's private memory space by forming an address comprising, as the most significant portion, the private memory space identification of the address conversion unit and the register in which the common memory address is stored, and, as the least significant portion, the least significant bits of the common memory address.

The flexibility of the invention is enhanced by providing multiple sets of the registers and a index register loaded by the processor to point to a specific set of registers that is active at any one time. The processor can change the active set of window address registers merely by changing the contents of the index register.

BRIEF DESCRIPTION OF THE DRAWINGS

The invention is pointed out with particularity in the appended claims. The above and further objects and advantages of the invention may be better understood by referring to the following description taken in conjunction with the accompanying drawings, in which:

DESCRIPTION OF AN ILLUSTRATIVE EMBODIMENT

The invention will be described in terms of a multiprocessor system in which a master processor schedules and coordinates the activities of a plurality of slave processors. The invention could also be advantageously used in multiprocessor systems that do not use the master/slave arrangements for scheduling and coordination, as well as in systems, as described above, in which the processors are special purpose processors used in controlling peripheral or input/output units in the system.

Figure 1:
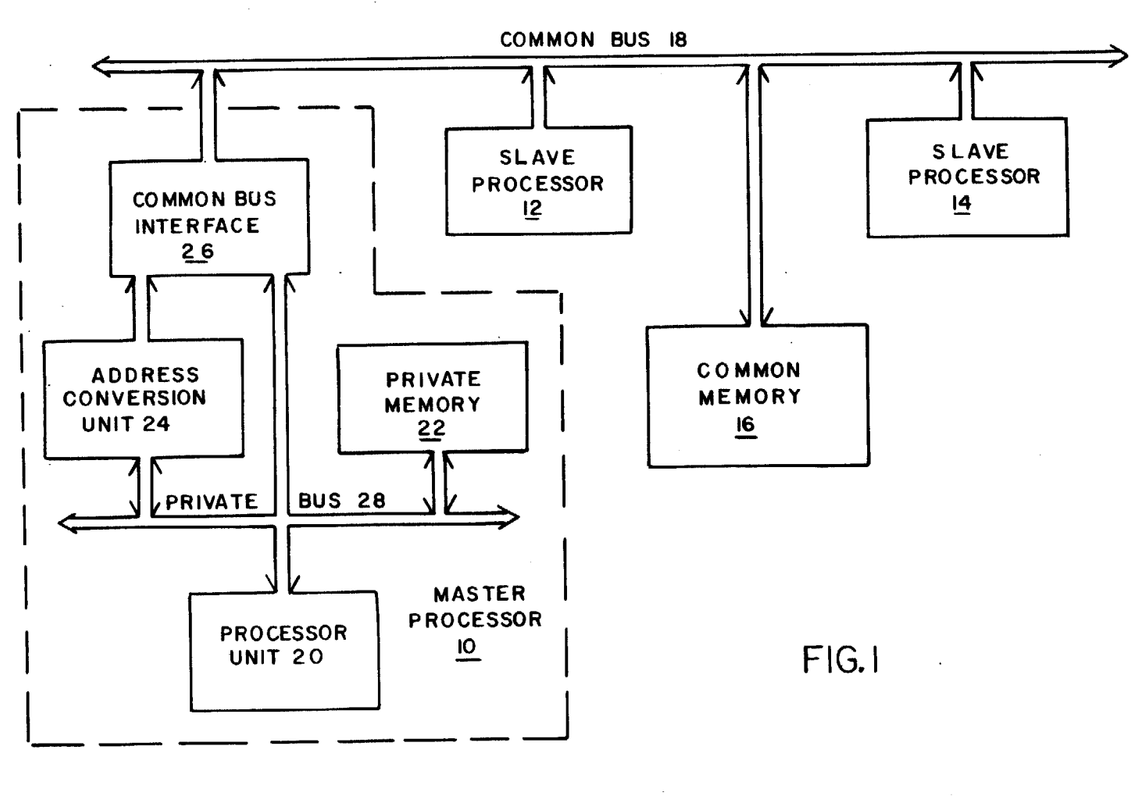
FIG. 1 is a block diagram of a multiprocessor system constructed in accordance with this invention.

Referring to FIG. 1, the basic elements of a multiprocessor system that embody the invention include a master processor 10 connected to several slave processors 12 and 14, and a common memory 16 over a common bus 18. The master processor 10 includes a processor unit 20 that connects to a private memory 22, an address conversion unit 24, and a common bus interface 26 over a private bus 28. The processor unit 20 transmits address and data with the private memory 22 and address conversion unit 24 over private bus 28, and with the common memory 16 through common bus interface 26 over common bus 18. Furthermore, processors 10, 12 and 14 may interrupt each other and transmit interrupt information over common bus 18. All of this communication may be by means well known in the art, and will not be discussed further herein.

The internal organization of the slave processors 12 or 14 may be similar to the organization of master processor 10 as depicted in FIG. 1. That is, each of slave processors 12 and 14 may also include a private memory for storing data and control programs executed only by that slave processor. Alternatively, all of the control programs and data for the slave processor may be stored in common memory 16. Since it will be apparent to those skilled in the art that the invention may be used in connection with any of the processors 10, 12 and 14 forming the multiprocessor system depicted in FIG. 1, attention here will be directed only to the master processor 10.

Figure 2:
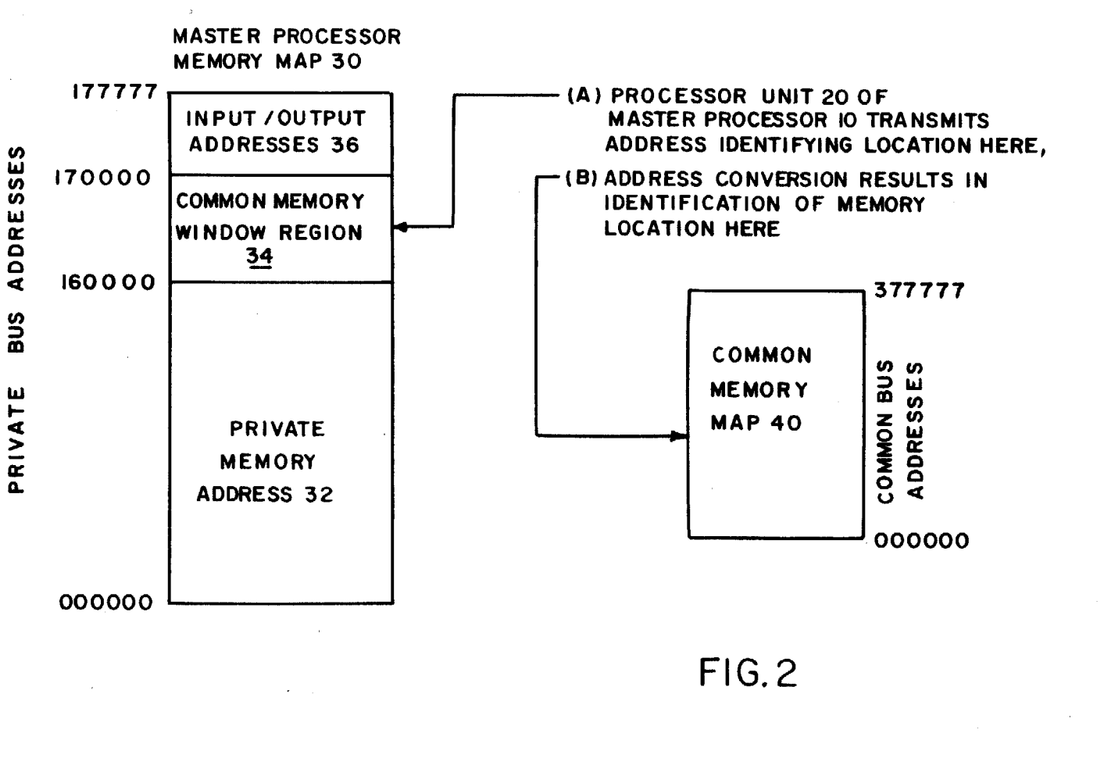
FIG. 2 is a diagram depicting memory maps for the private memory and the common memory which is useful in understanding the invention.

Accordingly, FIG. 2 is a memory map 30 depicting the organization of a private address space used by master processor 10 for its internal processing. This address space, in one specific embodiment, has the range (177777, octal, through 000000, octal). In particular, the private address space includes addresses that are allocated to private memory 22, whose storage locations may be directly addressed by processor unit 20 using addresses within the range of the private memory addresses 32 depicted in FIG. 2. Similarly, in its internal processing, processor unit 20 may use addresses in the range depicted as common memory window addresses 34 in memory map 30. Furthermore, input/output units that may be connected to master processor 10 may be addressed using addresses in the range indicated as input/output addresses 36 in memory map 30.

FIG. 2 also depicts a memory map of the address space of the common memory 16, which also includes a plurality of addressable storage locations. This address space, in one specific embodiment, has an address range of (377777, octal, through 000000, octal). As can be seen, the address space of addressable locations in common memory 16 and the private address space used by master processor 10 in its internal processing are separate and distinct. Accordingly, to permit master processor 10 to communicate with common memory 16, it must produce addresses within the address space for the common memory. This is done by address conversion unit 24.

Figure 3:
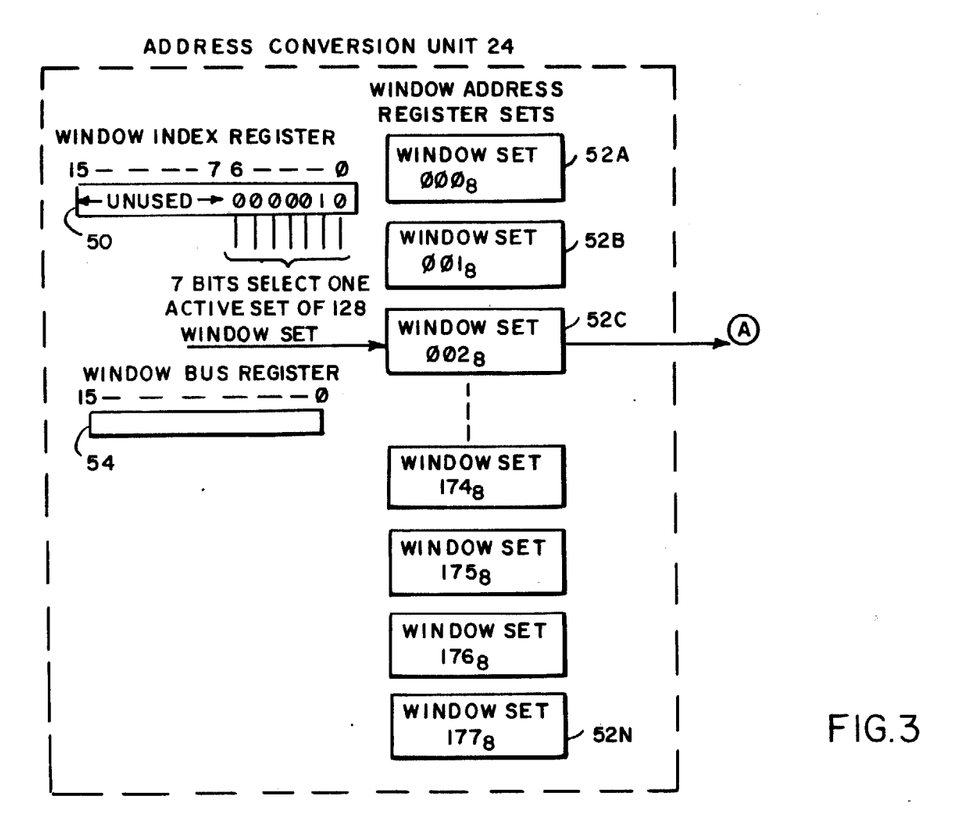
FIG. 3 is a diagram useful in understanding the operation of the address conversion unit depicted in FIG. 1.

In brief, with reference to FIG. 2, when the processor unit 20 of master processor 10 transmits addresses in certain address ranges in the processor's internal address space, particularly in the input/output range 36 in memory map 30, as indicated by arrow (A), address conversion unit 24 intercepts the address and generates an address in the address space of the common memory 16, as indicated by arrow (B). With reference to FIG. 3, address conversion unit 24 includes a window index register 50 which when loaded by processor unit 20 points to one of the plurality of sets of window address registers 52A through 52N. In one particular embodiment, window index register 50 can identify one of up to 128 (177 octal) sets of window address registers. The window index register 50 enables one set of the window address registers to be active, as described below. Since all of the sets of window address registers are identical, the discussion below will be restricted to set 52C, hereinafter generally referred to as set 52. The address conversion unit 24 also includes a window bus register 54, whose purpose will be made clear below.

Window address register set 52 includes eight registers, identified as window address registers WADR0 60 through WADR7 67. Prior to using address conversion unit 24, either processor unit 20, or slave processors 12 or 14, loads the registers with a value that point to, or identifies, an address in common memory 16. An example of such a value is depicted in FIG. 3 in window address register WADR1 61, which has the value 410 (octal). How this value is obtained will be made clear below.

After the window address registers 52 are loaded, processor unit 10 uses address conversion unit 24 to generate an address identifying a location in common memory 16. Specifically, processor unit 20 transmits an address in the private memory space onto private bus 28. The address may identify an addressable location in private memory 22 or in an input/output unit (not shown) if it is in the range indicated as private memory addresses 32 or input/output addresses 36 (FIG. 2), or, if the address is in the range of common memory window region 34 (FIG. 2) it will be intercepted by address conversion unit 24.

Assuming for purposes of this description that the private address from processor 20 is intercepted by address conversion unit 24, the address conversion unit decodes the private address and selects one of the registers 52 in the active set, as identified by the contents of window index register 50, to take part in the address conversion process. As an example in one specific embodiment of the invention using sixteen bit private addresses and in which the address space for the common memory, particularly depicted in FIG. 3, address 70 is an address in the processor's 20 private address space. If the four high order bits (15:12) of address 70 have a value 16 (octal), the internal address is in the range for common memory window region 34 (FIG. 2) for conversion to the address space for common memory 16, and address conversion unit 24 intercepts the internal address. The address conversion unit 24 uses private address bits (11:9) to identify the window address register whose contents are to be used in the conversion process. In the example depicted in FIG. 3, private address bits (11:9) contain the value (001) which identifies window address register WADR1 61.

In the example depicted in FIG. 3, the value 410 (octal) has previously been stored in window address register WADR1 61. The address conversion unit 24 then produces the address for the location in common memory 16. The nine high order bits of the contents of the window address register WADR1, which are identified generally by reference numeral 68 in FIG. 3, form the nine high order bits of the address for common memory 16. Bits (8:1) of private address 70 constitute the low order bits of the address to common memory 16. Bit (0) of private address 70 is used to identify which byte of the identified word is to be accessed.

When the location in common memory 16 is accessed, the contents of the window address register that was used in the conversion process are loaded into window bus register 54. Window bus register 54 thus receives the value 410 (octal). This may be used for diagnostic purposes if an error is detected.

The invention can be further shown by another example, which also illustrates the operation of the address conversion unit in converting addresses in the common memory address space to addresses in the private memory space, thereby allowing the processor 20 to use or identify locations in common memory 16 when processing its internal programs.

In one specific embodiment, the slave processors 12 and 14 load information into common memory 16 that may be used by master processor 10 for control purposes. This information may be, for example, status information indicating the status of the slave processor, information useful in diagnostic or maintenance processing, certain control information, and so forth. The slave processor loads the information for master processor into a particular location of common memory 16, for example, starting at common memory location (001020, octal). The starting location (001020) is addressed using seventeen-bit addresses in this example.

After loading the information into the common memory, the slave processor informs the master processor 10 of the location. In this example, the master processor has a sixteen-bit data path, and so the slave processor then transfers the upper sixteen bits of the address (001020, octal) to the master processor 10; the upper sixteen bits have the value (000410, octal).

The master processor 10 receives the upper sixteen bits of the common bus address from the slave processor and loads it into one of the window address registers, for example window address register WADR1 61. The master processor, specifically the address conversion unit 24, then constructs a private sixteen-bit address for the information for internal addressing and processing purposes. The address conversion unit constructs this address, which is designated 72 in FIG. 3, as follows:

(a) the four most significant bits (1110 binary, or 16 octal) are constant and identify the address conversion unit;

(b) the next three bits (001 binary, or 1 octal) identify the window address register containing the information, here window address register WADR1 61;

(c) the next seven bits (0001000) are the seven least significant bits from the window address register WADR1 61; and (d) the two least significant bits (00) are constants added by the address conversion unit 24.

The address conversion unit thus returns (161040, octal) when processor 20 reads window address register WADR1 61. This is the private address that the processor 20 uses for processing the information that has been loaded into common memory 16 by the slave processor.

When processor 20 desires to retrieve the information that the slave processor loaded into common memory 16, it transmits the internal address (161040, octal) onto private bus 28. The address is in the range of the common memory window region 34 (FIG. 2) and so the address conversion unit 24 recognizes this as an address for conversion. The address conversion unit then intercepts this private address and generates an address for the common memory as described above.

In particular, as shown in FIG. 3, when the address conversion unit receives the address (161040, octal) from private memory bus 28, it discards the four most significant bits (16, octal), which merely indicate that the address is in the common memory window region 34 (FIG. 2) and is to be converted. The next three bits (001 binary, or 1 octal), indicate that the contents of window address register WADR1 61 are to be used in the conversion. The address conversion unit then retrieves the contents of the window address register WADR1 61 and loads them into window bus register 54, where they may be available to processor 20 for diagnostic purposes in the event of error. Additionally, the nine most significant bits (15:7), identified by reference numeral 68, from window address register WADR1 form the most significant bits, that is, bits (16:8), of the common memory address 74 generated by the address conversion unit. Bits (7:0) of the common memory address 74 form bits (8:1) of the internal address from processor 20. Bit (0) of the private address is used to control signals transmitted over common bus 18 during byte transfer operations over the bus.

As a further feature of the invention, address conversion unit 24 can generate common memory addresses in an entire block of addresses shown in FIG. 3 based on the contents of window address register WADR1 61. As shown in FIG. 3, the nine most significant bits of the address which are retrieved from window address register WADR1 can be used to address a block of two hundred and fifty-six common memory locations having octal addresses (001000) through (001377). Therefore, a slave processor can load information for master processor 10 into a block of the common memory 16 and transmit one address to the master processor, which can then retrieve the information from the common memory 16 without further communication from the slave processor.

The foregoing description is limited to a specific embodiment of this invention. It will be apparent, however, that this invention can be practiced in data processing systems having diverse basic constructions or in systems that use different internal circuitry that is described in this specification with the attainment of some or all of the foregoing objects and advantages of this invention. Therefore, it is the object of the appended claims to cover all such variations and modifications as come within the true spirit and scope of this invention.

What is claimed as new and desired to be secured by Letters Patent of the United States is:

1. An address conversion unit for use in one processor in a multi-processor data processing system including a common memory, the processors and common memory being interconnected by a common bus including means for transferring address signals defining a common address space, the processor including private bus means including means for transferring signals including address signals defining a private address space, processor unit means connected to said private bus means and including means for transmitting and receiving signals including address signals over said private bus means for engaging in data transfers thereover, said address conversion unit being connected to said private bus means and common bus means for receiving address signals over said private bus means from said processor unit means in said private address space and comprising:
   A. pointer storage means for storing a pointer identifying a portion of said common bus memory space;
   B. pointer generation means connected to receive a common bus address and for generating a pointer in response thereto for storage in said pointer storage means; and
   C. common bus address generation means connected to said private bus and said pointer storage means for receiving an address from said processor unit means and for generating a common bus address in response thereto, said common bus address being used to initiate transfers between said processor unit means and said common memory over said common bus.

2. An address conversion unit as defined in claim 1 further including means connected to said pointer generation means for generating an address in said private bus address space and for transmitting said address to said processor unit means.

3. An address conversion unit as defined in claim 2 wherein said pointer storage means includes a plurality of register means each for storing a pointer and each identified by a register identification, said private bus address generation means including means for including the register identification of the register storing the associated pointer as part of the private bus address.

4. An address conversion unit as defined in claim 3 wherein said address conversion unit is operable in response to addresses in a selected range of said private bus address space identified by a predetermined code, said private bus address generation means including said code as the high-order portion of the generated private bus address and the low order contents of the selected register as the lower order portion of said private bus address.

5. An address conversion unit as defined in claim 3 wherein said plurality of register means is divided into a lesser plurality of sets of said register means, said unit further including set pointer means connected to said register means and being for connection to said private bus for receiving an identification from said processor unit means for identifying an active set of said register means, said private bus address generation means and said common bus address generation means using the active set of register means identified by said set pointer means in the generation of the respective private bus addresses and common bus addresses.

6. An address conversion unit as defined in claim 3 wherein said common bus address generation means comprises means for retrieving the high-order portion of the contents of the register means identified by said private bus address, and means for concatenating the low order portion of the private bus address to form the common bus address.

7. A data processing system including a plurality of processors and a common memory interconnected by a common bus including means for transferring address signals defining a common address space, at least one of said processors comprising:
   A. private bus means including:
      i. address signal transfer means for transferring private bus address signals defining a private address space, and
      ii. data signal transfer means for transferring data signals representing address in said common address space and addresses in said private address space;
   B. processor unit means connected to said private bus means and including means for transmitting and receiving signals including address signals and data signals over said private bus means for engaging in transfers of data signals thereover;
   C. private memory means connected to said private bus means and including means for receiving address signals and for engaging in memory transactions over said bus when said address signals are within a predetermined portion of said private address space; and
   D. address conversion means connected to said private bus means and comprising:
      i. private bus address conversion means connected to said private bus means and responsive to data signals representing addresses in said common address space for generating addresses in said private address space, and for transmitting the generated private address space address to said processor unit means as data signals; and
      ii. common bus address conversion means connected to said private address conversion means for generating address signals in said common address space when said private address signals are within another predetermined portion of said private address space and
   E. interface means connected to said common bus address conversion means, said data signal transfer means and said common bus means for engaging in data transfer over said common bus when it receives address signals in the common address space from the common bus address conversion means.

8. A data processing system as defined in claim 7 wherein said private bus address conversion means includes pointer storage means connected to receive data signals representing an address in said common address space for storing a pointer to said common address space, said private bus address conversion means further including means responsive to the receipt of data signals representing an address in said common address space for storing said data signals in a selected storage location and private bus address generation means connected to said pointer storage means and said private bus means for generating data signals representing address signals in said private address space and transmitting them over said private bus means to said processor unit means.

9. A data processing system as defined in claim 8 wherein said pointer storage means includes a plurality of storage locations each having a unique identification, said private bus address generation means including means for selecting one of said storage locations for storing said pointer and further including means for using the identification of the selected storage location in generating the address in the private address space.

10. A data processing system as defined in claim 9 wherein said pointer storage means further includes a plurality of sets of storage locations and index means identifying one of said sets as being an active set, said private bus address generation means being connected to said index means and including means for selecting a storage location in the active set in generating the address in the private address space.

11. A data processing system as defined in claim 8 wherein said private bus address generation means includes means for generating an address in said private address space by concatenating (1) as a high-order field of said address, a field identifying said pre-determined portion of said private address space, (2) as a middle field, a field containing the identification of the storage location containing the pointer, and (3) as a low-order field, the low-order field of the data representing the address in the common address space.

12. A data processing system as defined in claim 11 wherein said common address conversion means includes means responsive to the address signals received from said private bus means for selecting one of said storage locations, and common address space generation means for using the contents of the selected storage location to generate an address in said common address space, said common address space generation means being connected to couple the generated address in said common address space to said interface means.

13. A data processing system as defined in claim 12 wherein said common address space generation means includes means responsive to address signals containing a higher order field identifying said predetermined portion of said private address space for retrieving the contents of the storage location identified in the middle field, and for concatenating the contents of at least the high-order portion of said storage location to the low-order field of said address signals to form the address in the common address space.

14. An address conversion unit for use in a data processing system including a plurality of processors and a common memory interconnected by a common bus including means for transferring address signals defining a common address space, at least one of said processors comprising private bus means including address signal transfer means for transferring private bus address signals defining a private address space, and data signal transfer means for transferring data signals representing addresses in said common address space and addresses in said private address space, processor unit means connected to said private bus means and including means for transmitting and receiving signals including address signals and data signals over said private bus means for engaging in transfers of data signals thereover, and interface means connected to said common bus, said data signals transfer means and said common bus means for engaging in data transfers over said common bus, said address conversion unit being connected to said private bus means and said interface means for providing addresses in said common address space and comprising:

i. common bus address conversion means for generating address signals in said common address space when said private address signals are within another predetermined portion of said private address space and
  ii. private bus address conversion means responsive to data signals representing addresses in said common address space for generating addresses in said private address space, and for transmitting the generated private address space address to said processor as data signals; and 15. A data processing system as defined in claim 14 wherein said private bus address conversion means includes pointer storage means connected to receive data signals representing an address in said common address space for storing a pointer to said common address space, said private bus address conversion means further including means responsive to the receipt of data signals representing an address in said common address space for storing said data signals in a selected storage location and private bus address generation means connected to said pointer storage means and said private bus means for generating data signals representing address signals in said private address space and transmitting them over said private bus means to said processor unit means.

16. A data processing system as defined in claim 15 wherein said pointer storage means includes a plurality of storage locations each having a unique identification, said private bus address generation means including means for selecting one of said storage locations for storing said pointer and further including means for using the identification of the selected storage location in generating the address in the private address space.

17. A data processing system as defined in claim 16 wherein said pointer storage means further includes a plurality of sets of storage locations and index means identifying one of said sets as being an active set, said private bus address generation means being connected to said index means and including means for selecting a storage location in the active set in generating the address in the private address space.

18. A data processing system as defined in claim 15 wherein said private bus address generation means includes means for generating an address in said private address space by concatenating (1) as a high-order field of said address, a field identifying said pre-determined portion of said private address space, (2) as a middle field, a field containing the identification of the storage location containing the pointer, and (3) as a low-order field, the low-order field of the data representing the address in the common address space.

19. A data processing system as defined in claim 18 wherein said common address conversion means includes means responsive to the address signals received from said private bus means for selecting one of said storage locations, and common address space generation means for using the contents of the selected storage location to generate an address in said common address space, said common address space generation means being connected to couple the generated address in said common address space to said interface means.

20. A data processing system as defined in claim 19 wherein said common address space generation means includes means responsive to address signals containing a high order field identifying said predetermined portion of said private address space for retrieving the contents of the storage location identified in the middle field, and for concatenating the contents of at least the high-order portion of said storage location to the low-order field of said address signals to form the address in the common address space.

* * * * *